Feb. 3, 1925.                                             1,525,379
                    W. E. DUNSTON
           BUMPER ATTACHING AND SUPPORTING MEANS
                    Filed May 8, 1923
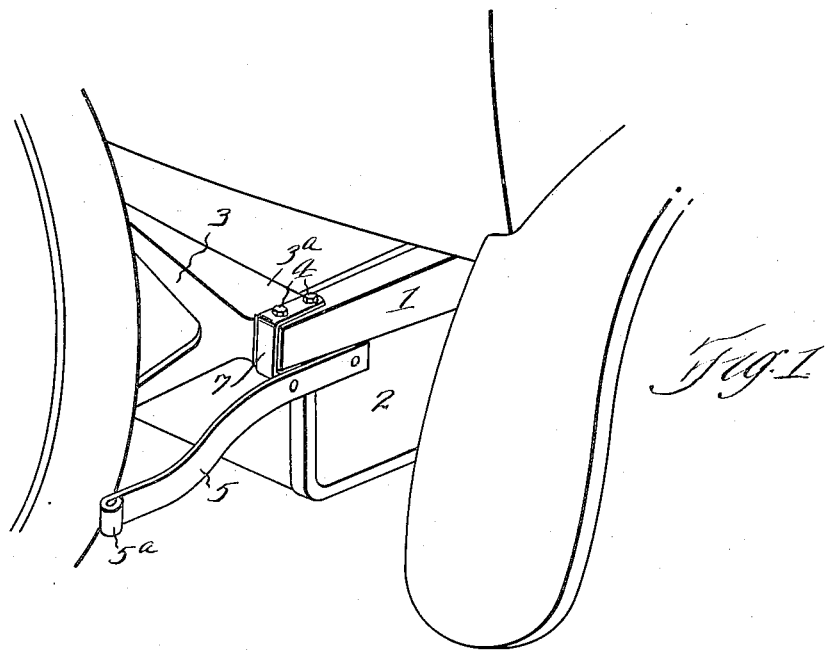
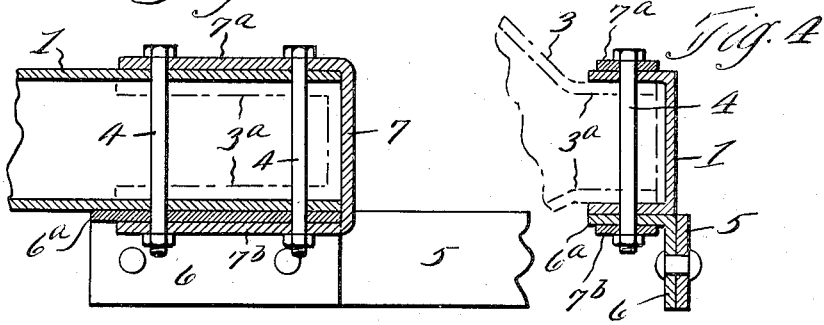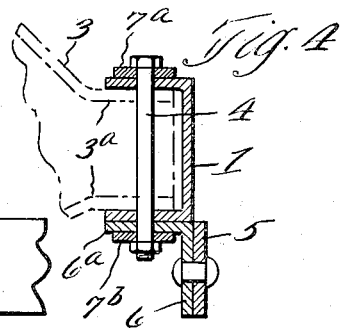
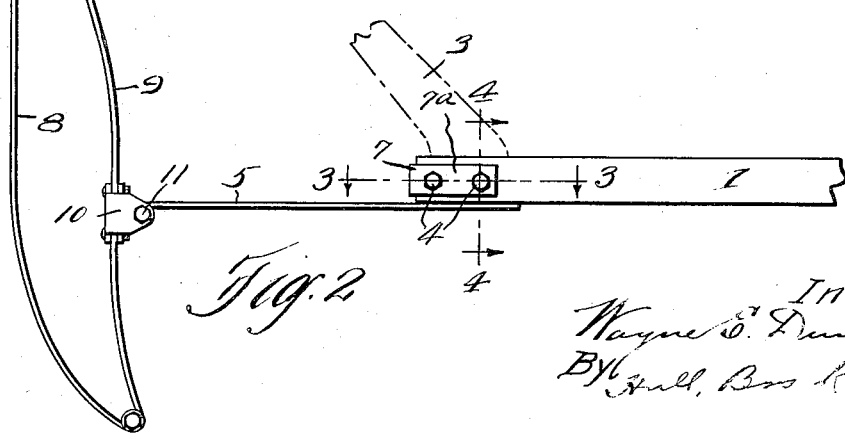

Patented Feb. 3, 1925.

1,525,379

UNITED STATES PATENT OFFICE.

WAYNE E. DUNSTON, OF DETROIT, MICHIGAN, ASSIGNOR TO THE C. G. SPRING & BUMPER COMPANY, OF DETROIT, MICHIGAN, A CORPORATION OF DELAWARE.

BUMPER ATTACHING AND SUPPORTING MEANS.

Application filed May 8, 1923. Serial No. 637,466.

*To all whom it may concern:*

Be it known that I, WAYNE E. DUNSTON, a citizen of the United States, residing at Detroit, in the county of Wayne and State of Michigan, have invented a certain new and useful Improvement in Bumper Attaching and Supporting Means, of which the following is a full, clear, and exact description, reference being had to the accompanying drawings.

This invention relates to means for supporting bumpers from automobile frames, and has for its general object to provide an efficient bumper support for use with certain constructions and installations of automobile frames and which will enable the supporting arms to be conveniently and quickly applied to such frames and to form, when so applied, means for efficiently supporting and sustaining the bumpers attached thereto. I accomplish the foregoing objects in and through the construction and arrangement of parts shown in the drawings, wherein Fig. 1 represents a perspective view of the rear portion of an automobile having my invention applied thereto; Fig. 2 a detail in plan of the frame member, supporting arm, and a portion of the bumper; and Figs. 3 and 4 sectional details corresponding respectively to the lines 3—3 and 4—4 of Fig. 2.

Describing the various parts by reference characters, 1 denotes the rear end portion of one of the side members of an automobile, the same being of the usual channeled construction. Each of these members extends rearwardly beyond the tank 2 and receives therewithin the channeled end 3ª of a tire carrier 3, the tire carrier being usually secured in place by means of bolts 4 extending through the top and bottom flanges of the side member.

In order to adapt the bumper supporting arm 5 to this installation, I secure, as by rivets, to the rear or inner end of such arm, an angle piece having a vertical flange 6 and a horizontal flange 6ª. The horizontal flange is adapted to fit beneath and engage the bottom of the lower flange of the member 1. In order to secure the parts in place, I slip over the rear end of the member 1 a U-shaped clamping bracket, indicated generally at 7, the upper member or branch 7ª of said bracket being adapted to engage the upper flange of the member 1 directly, while the lower branch or member 7ᵇ of the bracket is adapted to engage the under surface of the flange 6ª. Where tire carrier bolts 4 of sufficient length are employed, they may be removed, to permit of the application of the bracket and flange 6ª to the end of the frame, and then used to secure the bracket in place. If, however, the bolts are too short, longer bolts can be employed so that they may extend through the bracket; the flanges of the side member, and the flange 6ª, and the nuts may then be set up so as to clamp the parts firmly together.

In Fig. 2, the arm 5 is shown as connected to the rear bar 9 of a bumper, the front bar of which is indicated at 8, the connection shown comprising a clamp 10 applied to the rear bar and a bolt 11 pivotally securing the clamp to an eye 5ª at the rear or outer end of the said arm.

Having thus described my invention, what I claim is:

1. The combination, with the end of a side member of a vehicle, of a bumper supporting arm having a lateral projection adapted to engage a substantially horizontal face of said member, a U-shaped bracket extending about the end of said member, and bolts extending through said bracket, the said projection, and the said side member.

2. The combination, with the end of a side member of a vehicle, of a bumper supporting arm having a lateral projection adapted to engage a substantially horizontal face of said member, a U-shaped clamp extending about the end of said member and receiving the said projection, and bolts extending through said bracket, the said projection, and the said side member.

3. The combination, with the side member of a vehicle, of a bumper supporting arm having a lateral projection adapted to engage the lower surface of said member, a clamping bracket disposed longitudinally about the end of the side member and adapted to hold the said projection in engagement with the underside of the side member, and means for securing the clamping bracket to the said side member.

4. The combination, with the channeled side member of a vehicle, of a bumper supporting arm having a substantially horizontal flange adapted to engage the lower surface of said member, a U-shaped clamping bracket adapted to be applied to the end of said side member and to support the said flange between itself and the bottom of said member, and bolts extending through both branches of the clamping bracket, through the side member, and through the said flange.

5. The combination, with the side member of a vehicle, of a bumper-supporting arm having a lateral projection adapted to engage the lower surface of the said member, and a U-shaped bracket adapted to be slipped over the end of said side member and to support the said arm, through said projection, from the said side member.

6. The combination, with the side member of a vehicle, of a bumper supporting arm having a lateral projection adapted to engage a substantially horizontal surface of the said side member, and a U-shaped bracket adapted to be slipped over the said side member and to support the said arm, through said projection, from the said member.

In testimony whereof, I hereunto affix my signature.

WAYNE E. DUNSTON.